US012807898B2

(12) United States Patent
Gupta et al.

(10) Patent No.: US 12,807,898 B2
(45) **Date of Patent: *Nov. 24, 2026**

(54) LAUNDRY DETERGENT COMPOSITION

(71) Applicant: Church & Dwight Co., Inc., Princeton, NJ (US)

(72) Inventors: Archana Gupta, Belle Mead, NJ (US); David Treharne, Wall, NJ (US); Aidi Kong, Princeton, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,466

(22) Filed: Dec. 13, 2023

(65) Prior Publication Data

US 2024/0110129 A1 Apr. 4, 2024

Related U.S. Application Data

(63) Continuation of application No. 17/070,326, filed on Oct. 14, 2020.

(60) Provisional application No. 62/916,939, filed on Oct. 18, 2019.

(51) Int. Cl.

| | |
|---|---|
| ***C11D 17/00*** | (2006.01) |
| ***C11D 1/29*** | (2006.01) |
| ***C11D 1/72*** | (2006.01) |
| ***C11D 1/83*** | (2006.01) |
| ***C11D 1/831*** | (2006.01) |
| ***C11D 1/835*** | (2006.01) |
| ***C11D 3/04*** | (2006.01) |
| ***C11D 3/10*** | (2006.01) |
| ***C11D 3/33*** | (2006.01) |
| ***C11D 3/386*** | (2006.01) |
| *C11D 1/14* | (2006.01) |
| *C11D 1/22* | (2006.01) |
| *C11D 1/66* | (2006.01) |
| *C11D 1/722* | (2006.01) |

(52) U.S. Cl.

CPC .............. *C11D 1/8355* (2013.01); *C11D 3/10* (2013.01); *C11D 3/386* (2013.01); *C11D 1/143* (2013.01); *C11D 1/146* (2013.01); *C11D 1/22* (2013.01); *C11D 1/662* (2013.01); *C11D 1/72* (2013.01); *C11D 1/722* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 4,618,446 A | 10/1986 | Haslop et al. | | |
| 5,264,047 A | 11/1993 | Winston | C11D 3/10 | 134/40 |
| 5,834,411 A * | 11/1998 | Bolkan | C23G 1/14 | 510/421 |
| 5,919,745 A | 7/1999 | Cala | C11D 1/83 | 510/237 |
| 5,968,884 A | 10/1999 | Gopalkrishnan et al. | | |
| 6,054,424 A * | 4/2000 | Ip | C11D 1/83 | 510/424 |
| 6,177,396 B1 * | 1/2001 | Clapperton | C11D 3/364 | 510/340 |
| 6,897,188 B2 | 5/2005 | Gohl et al. | | |
| 7,375,070 B2 | 5/2008 | Pegelow | | |
| 7,709,436 B2 | 5/2010 | Theiler et al. | | |
| 7,754,669 B2 | 7/2010 | Bastigkeit et al. | | |
| 9,555,385 B2 | 1/2017 | Shen et al. | | |
| 9,677,030 B2 | 6/2017 | Napolitano | | |
| 10,066,190 B2 | 9/2018 | Coope-Epstein et al. | | |
| 10,800,995 B1 | 10/2020 | Sahley | C11D 1/662 | |
| 2002/0037826 A1 * | 3/2002 | Ip | C11D 3/046 | 510/424 |
| 2003/0148905 A1 * | 8/2003 | Motson | C11D 1/74 | 134/40 |
| 2004/0092422 A1 | 5/2004 | Carr | C11D 1/8305 | 510/421 |
| 2004/0102346 A1 | 5/2004 | Carr | C11D 3/06 | 510/276 |
| 2004/0198902 A1 | 10/2004 | Yui et al. | | |
| 2006/0105937 A1 | 5/2006 | Duran | C11D 3/046 | 510/504 |
| 2008/0064619 A1 * | 3/2008 | Bastigkeit | C11D 3/08 | 510/351 |
| 2009/0281010 A1 * | 11/2009 | Bastigkeit | C11D 3/382 | 510/102 |

(Continued)

FOREIGN PATENT DOCUMENTS

| | | |
|---|---|---|
| CN | 105647700 A | 6/2016 |
| EP | 2716747 | 4/2014 |

(Continued)

OTHER PUBLICATIONS

BG 112058 A (Year: 2017).*
CN 103350078 B (Year: 2016).*

*Primary Examiner* — Lorna M Douyon

(74) *Attorney, Agent, or Firm* — Church & Dwight Co., Inc.

(57) ABSTRACT

A liquid detergent composition is provided. The composition can be configured to provide high cleaning performance without the requirement of the inclusion of many components found in typical liquid laundry detergent compositions. The compositions may include a majority of an aqueous base, a surfactant system, a builder, and optionally further ingredients, such as a chelator and a fragrance.

14 Claims, No Drawings

(56) References Cited

U.S. PATENT DOCUMENTS

| | | | | |
|---|---|---|---|---|
| 2011/0305648 | A1 | 12/2011 | Knapek et al. | |
| 2011/0319312 | A1* | 12/2011 | Schwerter | C11D 1/83 510/495 |
| 2012/0071384 | A1 | 3/2012 | Christensen | C11D 3/43 510/335 |
| 2013/0012425 | A1 | 1/2013 | Jefferis et al. | |
| 2014/0187466 | A1 | 7/2014 | Lin | C11D 1/83 510/276 |
| 2014/0274861 | A1 | 9/2014 | Perovicova et al. | |
| 2015/0210957 | A1* | 7/2015 | Napolitano | C11D 17/0026 510/435 |
| 2017/0044471 | A1 | 2/2017 | Coope-Epstein | |
| 2017/0240846 | A1 | 8/2017 | Hunt, Jr. | B29C 63/0013 |
| 2018/0016523 | A1 | 1/2018 | Coope Epstein | G01N 33/26 |
| 2018/0216034 | A1 | 8/2018 | Camire et al. | |
| 2019/0002796 | A1 | 1/2019 | Vinson et al. | |
| 2019/0048296 | A1 | 2/2019 | Pirokowski | |

FOREIGN PATENT DOCUMENTS

| | | | | |
|---|---|---|---|---|
| EP | 2970823 | | 1/2016 | |
| EP | 3234090 | | 10/2017 | |
| EP | 3363887 | | 8/2018 | |
| EP | 3363888 | | 8/2018 | |
| EP | 3363889 | | 8/2018 | |
| EP | 3372664 | | 11/2018 | |
| EP | 3418370 | | 12/2018 | |
| EP | 3390599 | | 2/2020 | |
| WO | WO-0216537 | A1 * | 2/2002 | C11D 1/83 |
| WO | 2017102866 | | 6/2017 | |
| WO | 2017102868 | A1 | 6/2017 | |

* cited by examiner

LAUNDRY DETERGENT COMPOSITION

CROSS-REFERENCE TO RELATED APPLICATIONS

The present application is a continuation of U.S. patent application Ser. No. 17/070,326, filed Oct. 14, 2020, which claims priority to U.S. Provisional Patent Application No. 62/916,939, filed Oct. 18, 2019, the disclosures of which are incorporated herein by reference in their entirety.

FIELD OF THE INVENTION

The present invention relates to compositions for use in laundry machines, and more particularly to detergent compositions.

BACKGROUND

Many consumers of cleaning products, including laundry detergents, have a preference for products that include fewer chemicals and are thus perceived as being better for users of the cleaning products. Despite this preference, consumers still demand products that are easy to use as well as effective for the desired cleaning activity. This combination of properties, however, can be difficult to achieve, particularly in relation to laundry detergents. For example, an enzymatic liquid laundry detergent will typically include greater than twenty total ingredients and thus is labeled with a complicated listing of ingredients that is unappealing to many consumers.

While it is possible to form laundry detergent compositions with fewer products, it is challenging to achieve such composition that also exhibits a desirably high level of cleaning performance. Accordingly, there is still a desire and a need to provide a laundry detergent that is easy to use and exhibits high efficacy while being formulated from a relatively low number of ingredients.

SUMMARY OF THE DISCLOSURE

The present disclosure provides laundry detergent compositions. More particularly, the laundry detergent compositions can provide excellent cleaning efficacy while including only a limited number of ingredients. Rather than require a long listing of many ingredients that can be perceived as excessive and/or as not being environmentally friendly, the present compositions identify only a required, minimum number of ingredients that are effective to provide excellent cleaning. Even though a relatively small number of ingredients are used, the present compositions still provide desired efficacy and meet many consumer expectations in relation to liquid laundry detergent performance and other characteristics.

In some embodiments, a laundry detergent composition according to the present disclosure can comprise: an aqueous base; a surfactant system; and a builder; wherein the laundry detergent composition has a pH of about 7 to about 13 and has a viscosity of about 100 mPa-s to about 4000 mPa-s. In further embodiments, the laundry detergent composition can be defined in relation to one or more of the following statements, which can be combined in any number or order.

The laundry detergent composition can have a conductivity of about 16 mS/cm or greater.

The laundry detergent composition can have a conductivity of about 16 mS/cm to about 90 mS/cm.

The aqueous base can be present in an amount of about 55% by weight or greater based on the total weight of the laundry detergent composition.

The aqueous base can be present in an amount of about 55% to about 95% or about 55% to about 90% based on the total weight of the laundry detergent composition.

The surfactant system can be present in an amount of about 2.0% to about 45% based on the total weight of the laundry detergent composition.

The surfactant system can include one or more anionic surfactants.

The surfactant system can include the one or more anionic surfactants in a total amount of about 0.1% to about 25% by weight based on the total weight of the laundry detergent composition.

The surfactant system can include one or more nonionic surfactants.

The surfactant system can include the one or more nonionic surfactants in a total amount of about 0.1% to about 25% by weight based on the total weight of the laundry detergent composition.

The surfactant system can include one or more anionic surfactant(s) and one or more nonionic surfactant(s).

The anionic surfactant(s) and nonionic surfactant(s) can be present in a weight ratio (anionic:nonionic) of about 0.2 to about 1.8.

The builder can be present in an amount of about 0.01% to about 10% by weight based on the total weight of the laundry detergent composition.

The laundry detergent composition further can comprise a chelator.

The chelator, when present, can be included in an amount of about 0.01% to about 10% by weight based on the total weight of the laundry detergent composition.

The chelator can be configured so that at least 75% by weight thereof will degrade substantially completely under ambient conditions in a time of 14 days.

The surfactant system can comprise one or more components selected from the group consisting of sodium laureth sulfate (SLES), sodium lauryl sulfate (SLS), methyl ester sulfonate (MES), sodium $C_{10-16}$ alkylbenzene sulfonate (LAS), ethoxylated alcohols (AE) lauryl or myristyl glucosides (APG), and polyoxyethylene alkylethers (2° AE).

The builder can be an alkali carbonate and/or one or more materials configured for in situ generation of alkali carbonate, such as the combination of a bicarbonate and a hydroxide (e.g., sodium bicarbonate and sodium hydroxide).

The laundry detergent composition can exclude one or more of any enzyme, an enzyme stabilizer, a dispersing agent, an anti-foam agent, a brightener, and a dye.

The surfactant system can consist of a single anionic surfactant.

The surfactant system can consist of two anionic surfactants.

The surfactant system can consist of a single nonionic surfactant.

The surfactant system can consist of two nonionic surfactants.

The surfactant system can consist of a single anionic surfactant and a single nonionic surfactant.

The laundry detergent composition can include a total of ten components or less.

The laundry detergent composition can include a total of 3 to 9 components.

In one or more embodiments, a laundry detergent composition according to the present disclosure can comprise: about 55% by weight or greater an aqueous base; about 2.0% to about 45% by weight a surfactant system; about 0.01% to about 10% by weight a builder; and 0% to about 10% by weight of a chelator; wherein the laundry detergent composition has a pH of about 7 to about 13, a viscosity of about 100 mPa-s to about 4000 mPa-s, and a conductivity of about 16 mS/cm or greater.

In some embodiments, a laundry detergent composition according to the present disclosure can consist of: an aqueous base; a surfactant system; a builder; an optional chelator; an optional pH adjustor; and an optional fragrance. In further embodiments, the laundry detergent composition can be defined in relation to one or both of the following statements, which can be combined in any number or order.

The surfactant system can consist of a single anionic surfactant.

The surfactant system can consist of two anionic surfactants.

The surfactant system can consist of a single nonionic surfactant.

The surfactant system can consist of two nonionic surfactants.

The surfactant system can consist of a single anionic surfactant and a single nonionic surfactant.

The laundry detergent composition can include about 55% by weight or greater of the aqueous base.

The laundry detergent composition can include about 2.0% to about 45% by weight of the surfactant system.

The laundry detergent composition can include about 0.01% to about 10% by weight of the builder.

The laundry detergent composition can include about 0.01% to about 10% by weight of the chelator.

The laundry detergent composition can have a pH of about 7 to about 13.

The laundry detergent composition can have a viscosity of about 100 mPa-s to about 4000 mPa-s.

The laundry detergent composition can have a conductivity of about 16 mS/cm or greater.

These and other features, aspects, and advantages of the disclosure will be apparent from a reading of the following detailed description. The invention includes any combination of two, three, four, or more of the above-noted statements as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

DETAILED DESCRIPTION OF THE DISCLOSURE

The present disclosure now will be described more fully hereinafter. The disclosure may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural references unless the context clearly dictates otherwise.

The present disclosure relates to laundry detergent compositions that exhibit high efficacy while comprising only a relatively small number of total ingredients. For example, the present laundry detergent composition can comprise 10 or fewer, nine or fewer, eight or fewer, seven or fewer, six or fewer, five or fewer, or four or fewer total ingredients inclusive of the water content of the laundry detergent composition. Despite the significantly lower number of ingredients, the present laundry detergents can exhibit cleaning performance that matches or exceeds known laundry detergents having a significantly larger number of ingredients. The ability to provide high cleaning efficacy with only a limited number of ingredients arises at least in part from the recognition that cleaning efficacy can be achieved utilizing as few as only a single surfactant as the primary cleaning ingredient when further ingredients are combined in a manner that removes other barriers to cleaning efficacy (e.g., problems associated with "hard water") as well as product longevity (e.g., microbial spoilage). The combination of components likewise is effective to achieve various physical properties that are often desirable to consumers, such as a specific viscosity range, overall clarity, and the like.

The laundry detergent composition can comprise an aqueous base in which the remaining composition components are one or more of dissolved, suspended, dispersed, or otherwise entrained. The use of the term "aqueous base" is not intended to define a specific pH but rather can define the aqueous component as comprising a majority of the laundry detergent by total weight and/or volume thereof. Preferred product pH is otherwise described herein. The aqueous base preferably is water. In some embodiments, water that has been treated by reverse osmosis or deionized water particularly may be utilized. For example, in embodiments where a chelant may not be utilized, it can be desirable to utilize such treated water to ensure product clarity. Preferably, the laundry detergent is substantially or completely free of any organic solvent.

In one or more embodiments, the laundry detergent composition can include the aqueous base in an amount of about 55% by weight or greater, about 60% by weight or greater, about 65% by weight or greater, about 70% by weight or greater, or about 75% by weight or greater based on the total weight of the laundry detergent composition. In some embodiments the foregoing ranges may be inclusive up to a maximum aqueous base content of about 95% or about 90% by weight. In certain embodiments, the aqueous base may particularly be present in an amount of about 55% to about 95%, about 55% to about 90%, about 60% to about 88%, or about 65% to about 85% by weight based on the total weight of the laundry detergent composition.

The laundry detergent composition can comprise one or more surfactants effective for removal of various soiling materials from fabrics such as clothing, towels, and other textiles formed of natural and/or synthetic fibers, yarns, and woven and/or nonwoven fabrics made therefrom. The surfactant(s) may be defined in relation to be a "surfactant system," which is understood to refer to the total package of surfactant(s) that are present in the composition. In some embodiments the surfactant system may comprise or consist of only a single type of surfactant while in other embodiments the surfactant system may comprise or consist of a plurality of different types of surfactants. Preferably the surfactant system of the laundry detergent compositions comprises one or both of an anionic surfactant and a nonionic surfactant. In some embodiments, the surfactant system may include one or more surfactants consisting of only anionic surfactants. In other embodiments, the surfactant system may include one or more surfactants consisting of only nonionic surfactants. In further embodiments, the surfactant system may include two or more surfactants consisting of only anionic and nonionic surfactants. When both anionic and nonionic surfactants are present, it can be preferable for the total concentration of anionic surfactants to the total concentration of nonionic surfactants to be within a defined ratio. For example, the ratio of anionic surfactants to nonionic surfactants preferably can be about 0.2 to about 1.8, about 0.5 to about 1.5, about 0.8 to about 1.2, or about 0.9 to about 1.1 (the ratio being a weight/weight ratio). The total content of surfactant system present in the laundry detergent composition can be about 2.0% to about 45%, about 3.0% to about 35%, about 4.0% to about 25%, about 5.0% to about 20%, about 6.0% to about 15%, or about 7.0% to about 15% by weight based on the total weight of the laundry detergent composition Anionic surfactants suitable for use according to the present disclosure can include those that are configured for removal of soiling agents, such as dirt, clay, and/or oily materials. In some embodiments, the anionic surfactant may be configured for at least partial deposition onto surfaces of items being laundered to provide resistance to re-deposition of soiling agents onto the items during the laundering process. The anionic surfactant retained on the surfaces of the laundered items can be removed therefrom during the rinse cycle of the laundering process. A wide variety of anionic surfactants may be used according to the present disclosure. In various embodiments, a suitable anionic surfactant may include one or more salts (e.g., sodium, potassium, ammonium, and substituted ammonium salts such as mono-, di- and triethanolamine salts) of anionic sulfates, sulfonates, carboxylates, and sarcosinates. Exemplary anionic sulfates can include linear and/or branched primary and secondary alkyl sulfates, alkyl ethoxysulfates, fatty oleoyl glycerol sulfates, alkyl phenol ethylene oxide ether sulfates, $C_5$-$C_{17}$ acyl-N—($C_1$-$C_4$ alkyl) and —N—($C_1$-$C_2$ hydroxyalkyl) glucamine sulfates, and sulfates of alkylpolysaccharides, such as alkylpolyglucoside sulfates. Exemplary alkyl sulfates can include linear and branched primary $C_{10}$-$C_{18}$ alkyl sulfates. Exemplary alkyl ethoxysulfate surfactants can include $C_{10}$-$C_{18}$ alkyl sulfates that have been ethoxylated with from 0.5 to 20 moles of ethylene oxide per molecule. Exemplary anionic sulfonate surfactants can include salts of $C_6$-$C_{20}$ linear alkylbenzene sulfonates, alkyl ester sulfonates, $C_6$-$C_{22}$ primary or secondary alkane sulfonates, $C_6$-$C_{24}$ olefin sulfonates, sulfonated polycarboxylic acids, alkyl glycerol sulfonates, fatty acyl glycerol sulfonates, fatty oleyl glycerol sulfonates, and any mixtures thereof. Exemplary anionic carboxylates can include alkyl ethoxy carboxylates, and alkyl polyethoxy polycarboxylates. In some embodiments, preferred anionic surfactants can include various sulfates (e.g., alkyl ether sulfates, such as laureth sulfate salts), alkyl ester sulfonates, and alkylbenzene sulfonate (e.g., $C_5$ to $C_{20}$ or $C_{10}$ to $C_{16}$). Non-limiting examples of anionic surfactants that may be used herein include sodium laureth sulfate (SLES), sodium lauryl sulfate (SLS), methyl ester sulfonate (MES), and sodium $C_{10-16}$ alkylbenzene sulfonate (LAS). In certain embodiments, ethoxylated anionic surfactants may be utilized and may comprise a limited number of moles of ethylene oxide groups. For example, an alkyl ether sulfate anionic surfactant may comprise less than 5 moles, or less than 4 moles of ethylene oxide groups, such as 1 to 4 or 2 to 3 ethylene oxide groups. A single anionic surfactant may be utilized or a plurality of anionic surfactants (e.g., 2, 3, 4, or more) may be used. The total content of anionic surfactant(s) present in the laundry detergent composition can be 0% to about 45%, about 2.0% to about 45%, about 3.0% to about 35%, about 4.0% to about 25%, about 5.0% to about 20%, about 6.0% to about 15%, or about 7.0% to about 15% by weight based on the total weight of the laundry detergent composition. In some embodiments, such as where a nonionic surfactant may be preferred, the composition may be defined in relation to being expressly free of any anionic surfactants. When both an anionic and nonionic surfactants are present, it can be preferable for the anionic surfactant(s) to be present in a total concentration of about 0.1% to about 25%, about 1% to about 20%, about 2% to about 15%, or about 5% to about 15% by weight based on the total weight of the laundry detergent composition.

Nonionic surfactants suitable for use according to the present disclosure likewise can include those that are configured for removal of soiling agent as described above, and particularly those that can improve removal of oily materials on the laundered items. A wide variety of nonionic surfactants may be used according to the present disclosure. In various embodiments, a suitable nonionic surfactant may include alkyl ethoxylate condensation products of aliphatic alcohols with from 1 to 25 moles of ethylene oxide wherein the alkyl chain of the aliphatic alcohol can either be straight or branched, primary or secondary, and generally contains from 6 to 22 carbon atoms. Further suitable nonionic surfactants can include water soluble ethoxylated $C_6$-$C_{18}$ fatty alcohols and $C_6$-$C_{18}$ mixed ethoxylated/propoxylated fatty alcohols. For example, the ethoxylated fatty alcohols can be $C_{10}$-$C_{18}$ ethoxylated fatty alcohols with a degree of ethoxylation of from 3 to 20. In some embodiments, mixed ethoxylated/propoxylated fatty alcohols can have an alkyl chain length of from 10 to 18 carbon atoms, a degree of ethoxylation of from 3 to 30, and a degree of propoxylation of from 1 to 10. In further embodiments, suitable nonionic surfactants can include those formed from the condensation of ethylene oxide with a hydrophobic base formed by the condensation of propylene oxide with propylene glycol. Examples of compounds of this type include certain of the commercially-available Pluronic™ surfactants, marketed by BASF. Further, suitable nonionic surfactants can include those formed from the condensation of ethylene oxide with the product resulting from the reaction of propylene oxide and ethylenediamine. Examples of this type of nonionic surfactant include certain of the commercially available Tetronic™ compounds, marketed by BASF. In certain embodiments, suitable nonionic surfactants can be selected, for example, from various alcohol ethoxylates. In some embodiments, the nonionic surfactant can be defined in relation to the alcohol chain length and/or the number of ethoxylate groups present in the molecule. For example, the nonionic surfactant can comprise an alcohol ethoxylate formed from an alcohol with a carbon chain length of 3 to 20 carbon atoms, 5 to 20 carbon atoms, 7 to 19 carbon atoms, 9 to 18 carbon atoms, 10 to 17 carbon atoms, or 12 to 15 carbon atoms. As a further example, the nonionic surfactant can comprise an alcohol ethoxylate having 2 to 10, 4 to 9, or 6 to 8 moles of ethylene oxide per mole of alcohol. Non-limiting examples of nonionic surfactants that may be used herein include ethoxylated alcohols (AE) ($C_{12-5}$ alcohols, in particular), such as those available under the tradename NEODOL®, lauryl or myristyl glucosides (APG), and polyoxyethylene alkylethers (2° AE). A single nonionic surfactant may be utilized or a plurality of nonionic surfactants (e.g., 2, 3, 4, or more) may be used. The total content of nonionic surfactant(s) present in the laundry detergent composition can be about 0% to about 45%, about 2.0% to about 45%, about 3.0% to about 35%, about 4.0% to about 25%, about 5.0% to about 20%, about 6.0% to about 15%, or about 7.0% to about 15% by weight based on the total weight of the laundry detergent composition. In some embodiments, such as where an anionic surfactant may be preferred, the composition may be defined in relation to being expressly free of any nonionic surfactants. When both an anionic and nonionic surfactants are present, it can be preferable for the nonionic surfactant(s) to be present in a total concentration of about 0.1% to about 25%, about 1% to about 20%, about 2% to about 15%, or about 5% to about 15% by weight based on the total weight of the laundry detergent composition. Further, in some embodiments, the laundry detergent composition may be expressly free of any amphoteric surfactants.

In one or more embodiments, the laundry detergent composition can comprise one or more materials effective as and known as a chelator, chelant, or sequestering agent. Preferably, any chelators utilized herein are effective to provide one or more of the desired functions that have been found to be present in the presently disclosed laundry detergent compositions. For example, suitable chelators according to the present disclosure can specifically exhibit a relatively high binding capacity for polyvalent cations and particularly divalent cations (i.e., materials that are effective as polyvalent cation chelators and particularly as divalent cation chelators). Preferably, the chelator is suitable for effectively binding at least calcium and magnesium in solution. In some embodiments, the chelator can be suitable for binding even further moieties, such as any one or more of iron, lead, copper, zinc, cadmium, mercury, and manganese. Such binding capacity can be particularly useful for improving the clarity of the laundry detergent composition by binding components in the aqueous base that can contribute to composition turbidity, such as calcium or magnesium ions. For example, a chelator useful according to the present disclosure can exhibit a calcium binding capacity of about 110 mg $CaCO_3$ per gram or greater, about 120 mg $CaCO_3$ per gram or greater, about 130 mg $CaCO_3$ per gram or greater, about 140 mg $CaCO_3$ per gram or greater, or about 150 mg $CaCO_3$ per gram or greater (e.g., up to a maximum binding capacity that is consistent with recognized chemical limitations). In some embodiments, the chelator can exhibit a calcium binding capacity of about 110 mg $CaCO_3$ per gram to about 250 mg $CaCO_3$ per gram, about 120 mg $CaCO_3$ per gram to about 225 mg $CaCO_3$ per gram, or about 130 mg $CaCO_3$ per gram to about 200 mg $CaCO_3$ per gram. Use of such chelator can be beneficial to limit requirements on purity for the aqueous base in some embodiments. In some embodiments, however, if it is desirable to prepare the composition without a chelator, it can be useful to use purified water, such as water that has been subjected to reverse osmosis purification and/or deionization. In addition to the foregoing, chelators useful according to the present disclosure can specifically exhibit stabilizing effects on the overall laundry detergent composition. This can arise, for example, from the chelator providing an effect in inhibiting microbial growth since the ability to complex various metals, such as iron, can inhibit growth of certain bacteria.

Chelators useful in the present laundry detergent compositions, in some embodiments, particularly may exhibit relatively high biodegradability. Since many cleaning compositions can include components that are not commonly recognized as being “environmentally friendly,” the present composition is particularly beneficial in being able to provide high cleaning efficacy while also having relatively low environmental impact in light of the ability to readily degrade. For example, it is preferable for the chelator utilized herein to provide a specific percentage of degradation within a defined time range. In some embodiments, the chelator can be configured so that at least 75%, at least 80%, or at least 85% by weight thereof (inclusive up to a total of 100%) can be degraded under ambient conditions in a time of 14 days.

Chelators suitable for use according to the present disclosure can include any material exhibiting properties as described above. As a non-limiting example, trisodium methylglycine diacetate (MGDA), tetrasodium glutamate diacetate (GLDA), ethylenediamine-N,N'-disuccinic acid (EDDS), polyaspartic acid, iminodisuccinic acid (IDS), and trisodium citrate can be particularly suitable for use as a chelator in compositions according to the present disclosure. In some embodiments, however, further types of chelators may be utilized if high biodegradability, for example, is not of concern. In particular, common chelators, such as ethylenediamine tetraacetic acid (EDTA), sodium tripolyphosphate (STPP), diethylene triamine pentaacetic acid (DTPA), or similar chelators may be utilized. A single chelator may be utilized or a plurality of chelators (e.g., 2, 3, 4, or more) may be used. The total content of chelator(s) present in the laundry detergent composition can be 0% to about 10%, about 0.02% to about 8%, about 0.05% to about 5%, about 0.08% to about 4%, about 0.1% to about 2%, or about 0.12% to about 1% by weight based on the total weight of the laundry detergent composition.

The laundry detergent further can comprise one or more builders. In some embodiments, suitable builders may be effective as alkalinizing agents. In further embodiments, further can comprise one or more builders. In some embodiments, suitable builders may be effective as viscosifiers. In some embodiments, a single builder may be utilized as both an alkalinizing agent and a viscosifier. For example, various alkali carbonates and/or other inorganic alkalinizing agents may be utilized to increase the pH of the laundry detergent composition while simultaneously increasing the viscosity to a desired level. Preferably, sodium and/or potassium salts (e.g., $K_2CO_3$ and/or $Na_2CO_3$) may be used. For example, soda ash can be used. In some embodiments, one or more components may be utilized for formation of a carbonate in situ. For example, bicarbonates and hydroxides in combination can be effective for in situ formation of a carbonate. In an example embodiment, sodium bicarbonate and sodium hydroxide may be utilized for this purpose, and other forms of bicarbonates and hydroxides may likewise be utilized.

Preferably, a builder, such as soda ash or other material(s) effective for formation of a carbonate species, is utilized in an amount effective to increase composition pH above the pH of substantially pure water in light of the high content of aqueous base that is utilized in the present compositions. In some embodiments, the laundry detergent composition thus can be provided with a composition pH that is sufficiently high to assist in inhibiting microbial growth as well as improving cleaning efficacy. For example, composition pH can be about 7 or greater, about 8 or greater, about 9 or greater, about 9.5 or greater, about 10 or greater, about 10.5 or greater, or about 11 or greater. In some embodiments, composition pH can be about 7 to about 13, about 8 to about 13, about 9 to about 13, about 10 to about 12.5, or about 10.5 to about 12. Preferably, composition pH is sufficient so that, when diluted with water in a wash cycle, the water-diluted wash cycle composition maintains a pH in the range of about 6 to about 9, about 7 to about 9, or about 7.5 to about 8.5.

The utilization of a builder that is effective as an alkalinizing agent, particularly when combined with a chelator as described above, can be useful to reduce or eliminate the need for any dedicated preservative in the laundry detergent composition. This is particularly beneficial since many preservatives are not necessarily biodegradable and may be perceived by a consumer as being undesirable in a cleaning product that is used with wearable items (i.e., clothing). Moreover, the use of materials such as soda ash can simultaneously be effective to provide a water softening effect and thus improve the cleansing capability of the laundry detergent since many municipal and personal water sources (e.g., wells) may include a high content of water hardening compounds (e.g., calcium and magnesium).

A viscosifier preferably is included in an amount effective to increase composition viscosity to a desired range. Such range may be chosen in particular to avoid splashing of the product upon dispensing and also to improve the ability of the consumer to readily identify the liquid as a cleaning product and not simply a water-based product. For example, many consumers are predisposed to believe that laundry detergents inherently are more viscous than water; however, given the high content of aqueous base that is utilized in the present compositions, it can be necessary to utilize components that increase product viscosity to avoid confusion among consumers. As discussed above, the builder may specifically be effective as a viscosifiers; however, a dedicated viscosifiers may be included in addition to a builder if desired. It is understood, though, that a dedicated viscosifiers may be expressly excluded when the builder is also effective as a viscosifiers. Preferably, the builder will function as both an alkalinizing agent and a viscosifiers to thus reduce the total number of components that are required in forming the composition. For example, soda ash and other carbonates in particular may be utilized as the viscosifiers as well as the alkalinizing agent. The viscosifying agent is utilized in a content suitable to increase the viscosity of the laundry detergent composition to a range of about 100 millipascal-seconds (mPa-s) to about 4000 mPa-s, about 150 mPa-s to about 3000 mPa-s, about 200 mPa-s to about 2500 mPa-s, about 225 mPa-s to about 2000 mPa-s, or about 250 mPa-s to about 1500 mPa-s (measured at 21° C. using a standard, shear rheometer, such as available from Anton Parr). As a non-limiting example, a builder that is effective as both an alkalinizing agent and a viscosifier may be present in the laundry detergent composition in an amount of about 0.01% to about 10%, about 0.1% to about 9%, about 0.5% to about 7%, about 1.0% to about 6%, about 1.5% to about 5%, or about 2% to about 4% by weight based on the total weight of the laundry detergent composition.

In one or more embodiments, the laundry detergent composition may include additional components. For example, a bicarbonate compound, such as sodium bicarbonate, may be included in the composition. Sodium bicarbonate in particular can be beneficial as a cleaning additive and/or for providing deodorization properties to the laundry detergent. In some embodiments, bicarbonate(s) (including at least sodium bicarbonate) may be included in the composition in a total amount of 0% to about 5.0%, about 0.01% to about 4.0%, about 0.02% to about 3.0%, or about 0.05% to about 2.0% by weight based on the total weight of the laundry detergent composition.

If desired, one or more further components may also be utilized in the present laundry detergent; however, it can be preferred to minimize the number of ingredients as otherwise described above. As non-limiting examples, any one or more of the following additives may be included in the laundry detergent composition: betaine and amino-oxide type surfactants, enzyme(s), enzyme stabilizer(s), dye(s), optical brightener(s), antiredeposition polymer(s), fluorescent whitening agent(s), fragrance(s), bittering agent(s), thickener(s), antifoaming agent(s), pH adjustor(s), bleach (es), fabric softener(s), pearl luster agent(s), preservative(s), laundry booster(s), etc. In general, such additional ingredients in the laundry detergent compositions can be present, independently, in an amount of 0% to about 4.0%, about 0.01% to about 3.0%, about 0.02% to about 2.0%, or about 0.05% to about 1.0% by weight based on the total weight of the laundry detergent composition.

In one or more embodiments, a laundry detergent composition according to the present disclosure can be defined at least in part in relation to a conductivity of the composition. For example, the conductivity of the present laundry detergent compositions may be about 16 mS/cm or greater, about 20 mS/cm or greater, or about 30 mS/cm or greater (e.g., up to a maximum conductivity of about 100 mS/cm). More particularly, laundry detergent conductivity can be in the range of about 16 mS/cm to about 90 mS/cm, about 18 mS/cm to about 85 mS/cm, about 20 mS/cm to about 80 mS/cm, about 25 mS/cm to about 75 mS/cm, or about 30 mS/cm to about 70 mS/cm.

The presently disclosed laundry detergent compositions can be characterized, in some embodiments, in relation to the ability to provide cleaning performance that is equal to or greater than the cleaning performance of known laundry detergents that include a significantly greater number of total components. As such, the present compositions may be defined not only in relation to the components that are present but also in relation to one or more components that are expressly excluded. In particular, a laundry detergent composition of the present disclosure may be defined in relation to any or more of the following statements (which may be modified as appropriate based on disclosure otherwise provided herein).

A laundry detergent may be formed of a total of 10 components or less, 9 components or less, 8 components or less, or 7 components or less. More particularly, a laundry detergent may be formed of a total of 3 to 9 components, 4 to 8 components, or 5 to 7 components.

A laundry detergent may comprise water, a surfactant system, a builder, and optionally any one or more of a chelator, sodium bicarbonate, fragrance, and any further component discussed above. The surfactant system may consist of only a single anionic surfactant or two anionic surfactants. The surfactant system may consist of only a single nonionic surfactant or two nonionic surfactants. The surfactant system may consist of only a single anionic surfactant and a single nonionic surfactant.

A laundry detergent may expressly exclude any one or more of an enzyme, an enzyme stabilizer, a dedicated pH adjustor (e.g., other than a builder), a dispersing agent, a dedicated viscosity adjustor (e.g., other than a builder), an anti-foam agent, a brightener, a preservative, and a dye. Further, any other component described herein that is not otherwise defined as being required may be optionally, expressly excluded.

A laundry detergent may consist of water, one or two anionic surfactants, a builder, and optionally any one or more of a chelator, sodium bicarbonate, a dedicated pH adjustor (e.g., other than a builder), and fragrance. A laundry detergent may consist of water, one or two nonionic surfactants, a builder, and optionally any one or more of a chelator, sodium bicarbonate, and fragrance. A laundry detergent may consist of water, one anionic surfactant, one nonionic surfactant, a builder, and optionally any one or more of a chelator, sodium bicarbonate, and fragrance.

EXPERIMENTAL

Tests were carried out to evaluate cleaning performance of exemplary compositions according to the present disclosure in comparison to a typical, enzymatic liquid laundry detergent. The comparative laundry detergent was a commercially available liquid laundry detergent available from Church & Dwight Co., Inc., which includes in excess of 20 different components. The experimental compositions used in the test were formed of water, a chelator, sodium carbonate, sodium bicarbonate, and one or a combination of two surfactants. Cleaning performance measured utilizing the standard testing method for cleaning performance as recited in ASTM D4265-14. In particular, 22 types of stains were provided on both cotton swatches and polycotton swatches for a total of 44 swatches in each test. Thus 44 swatches were subjected to the standard test using the comparative detergent and compositions using each of the experimental surfactants shown below. Relative cleaning performance is provided in the final column showing the number of test swatches that were evaluated to have exhibited equal to or better cleaning than the comparative detergent.

| Sample | Surfactant(s) | Cleaning Performance |
|---|---|---|
| Comparative detergent | 2 anionic and 1 nonionic | — |
| Experimental 1 | SLES | ≥31/44 |
| Experimental 2 | AE | ≥30/44 |
| Experimental 3 | SLS:AE (1:1) | ≥30/44 |
| Experimental 4 | MES:AE (1:1) | ≥30/44 |
| Experimental 5 | SLES:AE (1:1) | ≥32/44 |
| Experimental 6 | LAS:AE (1:1) | ≥38/44 |
| Experimental 7 | SLES:APG (1:1) | ≥31/44 |
| Experimental 8 | SLES:2° AE (1:1) | ≥33/44 |

As seen in the above table, every experimental composition exhibited equal to or better cleaning than the comparative detergent on at least 30 of the 44 swatches tested. Thus, the testing illustrated that a composition according to the present disclosure utilizing only a relatively small number of components can meet and exceed the cleaning performance of commercial detergents including significantly more ingredients.

In light of the foregoing, it is evident that the presently disclosed compositions can provide high cleaning efficacy while utilizing only a limited number of components. In some embodiments, the presently disclosed compositions and methods of utilizing such compositions for laundering textiles, such as clothing items, can be characterized as providing a cleaning efficacy relative to other compositions that include a significantly higher number of components (e.g., 10 or more, 12 or more, 15 or more, or even 20 or more components). Retained cleaning efficacy can be defined as exhibiting a cleaning performance that is equal to or greater than the cleaning performance of a comparative laundry detergent having a greater number of components (such as in one of the ranges noted above) when tested according to ASTM D4265-14. Specifically, retained cleaning efficacy can be defined as providing the noted performance on 50% or greater, 60% or greater, 65% or greater, or 70% or greater of the total number of test items laundered utilizing the two, tested detergents.

The "about" as used herein can indicate that certain recited values are intended to be read as encompassing the expressly recited value and also values that are relatively close thereto. For example, a value of "about" a certain number can indicate the specific number as well as values that vary therefrom (+ or −) by 5% or less, 4% or less, 3% or less, 2% or less, or 1% or less. In some embodiments, the values may be defined as being express and, as such, the term "about" (and thus the noted variances) may be excluded from the express value.

Many modifications and other embodiments of the disclosure will come to mind to one skilled in the art to which this disclosure pertains having the benefit of the teachings presented in the foregoing description; and it will be apparent to those skilled in the art that variations and modifications of the present disclosure can be made without departing from the scope or spirit of the disclosure. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A laundry detergent composition comprising:

a total of 6 components or less, wherein the components include:

an aqueous base in an amount of about 70% by weight or greater, based on the total weight of the composition;

an anionic surfactant and a nonionic surfactant present in a weight ratio (anionic:nonionic) of about 0.5 to about 1.5;

a chelator selected from the group consisting of trisodium methylglycine diacetate (MGDA), tetrasodium glutamate diacetate (GLDA), ethylenediamine-N,N'-disuccinic acid (EDDS), and polyaspartic acid;

a water softening material; and a bicarbonate;

wherein the composition formed of the 6 components or less has a viscosity of about 250 mPa-s to about 1500 mPa-s and a conductivity of about 20 mS/cm to about 80 mS/cm.

2. The laundry detergent composition of claim 1, wherein the nonionic surfactant and the anionic surfactant are present in a combined total amount of about 5% to about 20% by weight, based on the total weight of the composition.

3. The laundry detergent composition of claim 1, wherein the composition comprises only a single anionic surfactant.

4. The laundry detergent composition of claim 1, wherein the composition comprises only a single nonionic surfactant.

5. The laundry detergent composition of claim 1, wherein the composition comprises only a single anionic surfactant and only a single nonionic surfactant.

6. The laundry detergent composition of claim 1, wherein the nonionic surfactant comprises an ethoxylated alcohol.

7. The laundry detergent composition of claim 1, wherein the anionic surfactant comprises an alkyl ether sulfate.

8. The laundry detergent composition of claim 1, wherein the chelator is present in an amount of about 0.02% to about 8% by weight, based on the total weight of the composition.

9. A laundry detergent composition comprising:

a total of 6 components or less, wherein the components include:

an aqueous base present in an amount of about 75% to about 95% by weight, based on the total weight of the composition;

a surfactant system comprising at least one nonionic surfactant and at least one anionic surfactant, the surfactant system present in a total amount of about 4% to about 25% by weight, based on the total weight of the composition, wherein the anionic surfactant and the nonionic surfactant are present in a weight ratio (anionic:nonionic) of about 0.5 to about 1.5;

a chelator present in an amount of about 0.02% to about 8% by weight, based on the total weight of the composition, the chelator selected from the group consisting of trisodium methylglycine diacetate (MGDA), tetrasodium glutamate diacetate (GLDA), ethylenediamine-N,N'-disuccinic acid (EDDS), and polyaspartic acid;

a bicarbonate; and a hydroxide.

10. The laundry detergent composition of claim 9, wherein the composition comprises only a single anionic surfactant.

11. The laundry detergent composition of claim 9, wherein the composition comprises only a single nonionic surfactant.

12. The laundry detergent composition of claim 9, wherein the composition comprises only a single anionic surfactant and only a single nonionic surfactant.

13. The laundry detergent composition of claim 9, wherein the composition is configured to have a viscosity of about 250 mPa-s to about 1500 mPa-s.

14. The laundry detergent composition of claim 9, wherein the composition is configured to have a conductivity of about 20 mS/cm to about 80 mS/cm.

* * * * *